R. CRABB.
NEEDLE OR PIN POINT GRINDING MACHINE.
APPLICATION FILED AUG. 2, 1911.

1,060,322.

Patented Apr. 29, 1913.

WITNESSES
Cornelius Zabriskie
Frances M. Blodgett.

INVENTOR:
Robert Crabb,
BY
Russell M. Everett,
ATTORNEY.

R. CRABB.
NEEDLE OR PIN POINT GRINDING MACHINE.
APPLICATION FILED AUG. 2, 1911.

1,060,322.

Patented Apr. 29, 1913.

WITNESSES
Cornelius Zabriskie.
Frances E. Blodgett.

INVENTOR:
Robert Crabb,
BY
Russell M. Everett,
ATTORNEY.

COLUMBIA PLANOGRAPH CO., WASHINGTON, D. C.

UNITED STATES PATENT OFFICE.

ROBERT CRABB, OF NEWARK, NEW JERSEY, ASSIGNOR TO WILLIAM CRABB & COMPANY, A CORPORATION OF NEW JERSEY.

NEEDLE OR PIN POINT GRINDING MACHINE.

1,060,322.  Specification of Letters Patent.  Patented Apr. 29, 1913.

Application filed August 2, 1911. Serial No. 642,019.

*To all whom it may concern:*

Be it known that I, ROBERT CRABB, a citizen of the United States, residing at Newark, in the county of Essex and State of New Jersey, have invented certain Improvements in Needle or Pin Point Grinding Machines, of which the following is a specification.

This invention relates to machines for pointing pieces of wire or rods, either at one end or both, in the manufacture of pins or needles or pointed wire or rods of any kind whatsoever.

The objects of the invention are to enable the grinding wheel and wire-feeding disks to be driven at different speeds by one and the same belt or equivalent means; to secure simplified adjustable bearings for the grinding-wheel; to provide means mounted upon the machine itself for stopping the wire-feeding disks simultaneously with the raising of the table; to secure a simple and efficient construction of such means, and to obtain other advantages and results as may be brought out in the following description.

Referring to the accompanying drawings, in which like numerals of reference indicate the same parts throughout the several figures, Figs. 9 and 10 are longitudinal vertical sectional representations of portions of the table of the machine and a cam-operated mechanism, said sections being taken on line E—E, Fig. 2, Fig. 9 showing the position of parts when the table is lowered to grind points and Fig. 10 showing the position of parts when the table is raised to stop the feeding disks; Fig. 11 is a detail side elevation, and Fig. 12 a detail top view, of the parts of the machine which are actuated by the said cam-operated mechanism; Fig. 13 is a sectional view taken on line F—F, Fig. 11; Fig. 14 shows in detail one of the adjustable bearings for the ends of the grinding wheel shaft.

In said drawings, the machine or apparatus has a suitably formed framework comprising the longitudinally extending sides 2, 2, connected in any suitable manner, as by tie-rod, and adapted to be bolted to the floor, said frame being open at the ends 3, 4. As shown, the end-portion 3 of the said framework is higher than the end-portion 4 thereof, so that the upper supporting flanges 5, 5 of the said framework are angularly inclined from the one end 3 of the machine to the other end 4 of the same. Upon said upper inclined supporting flanges 5, 5 of said framework is a table 7 hinged to the high end 3 of the frame by a transverse rod 81, hereinafter more fully described. The rear ends of the upper edges of the supporting flanges 5, 5, are rounded off, transversely, as at 6, so as to be cleared by the table 7 in tipping upon its hinge rod 81.

Figures 1, 15, 16:
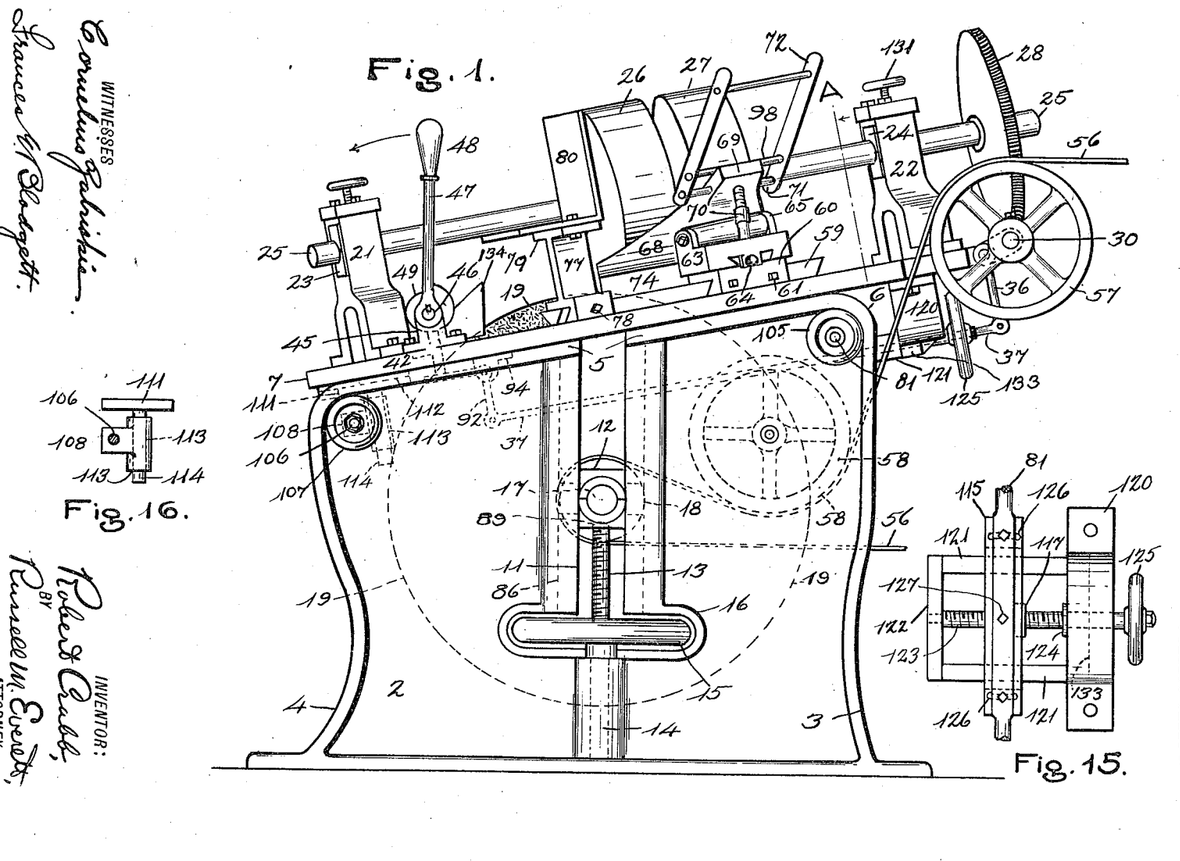
Figure 1 is an elevation of a machine, from the side at which the operator stands, showing one embodiment of the present invention.
Fig. 15 is a detail plan of certain means for adjusting the table longitudinally, detached from said table.
Fig. 16 is a detail side elevation of a certain carrier for adjusting the front end of the table laterally.
Figure 2:
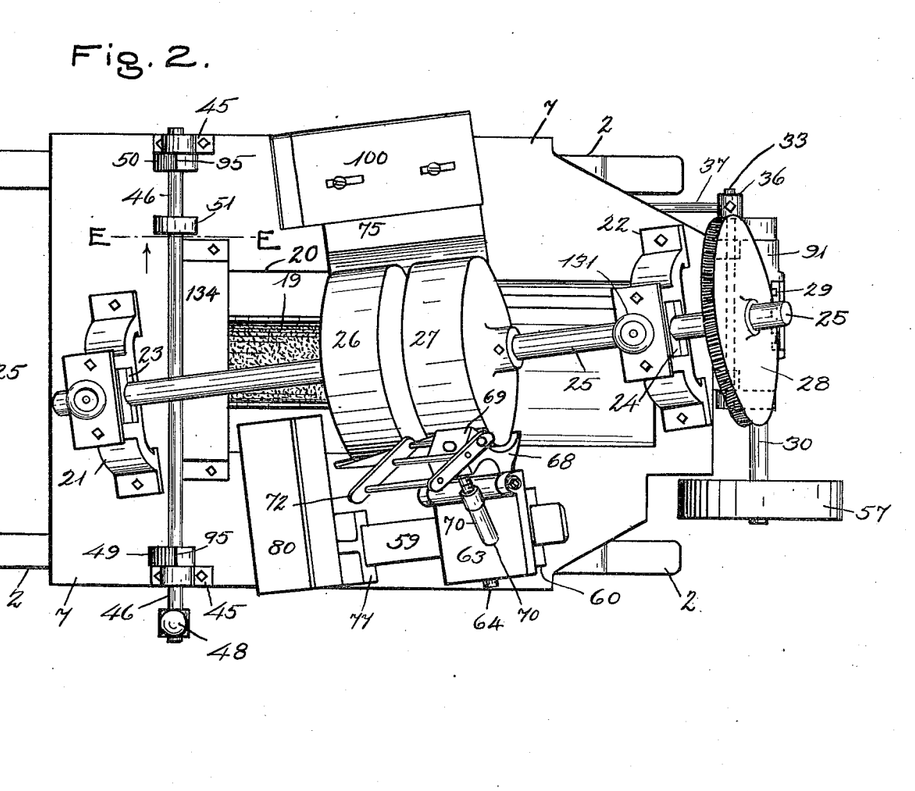
Fig. 2 is a top or plan view of the same.

As shown in Fig. 1 of the drawings, the sides 2 of the framework are made with oppositely located and vertically extending openings 11, which provide suitable guides for bearing or journal boxes 12 slidably arranged in said guides. Each journal-box 12 rests upon the upper end of an adjusting screw 13, the lower portion of each screw extending into a socket 14 forming part of each side 2 of said framework, and affording clearance space for the lower end of the screw. The upward and downward movement of each screw 13 is produced by a hand-wheel, as 15, threaded at its hub upon the screw, and being retained against any upward or downward movement by being arranged and rotating in lateral extensions 16 of the slideway 11 of the side 2, substantially as shown, and as will be clearly understood from an inspection of said Fig. 1 of the drawings.

Each bearing-box comprises slides 85, 85 mounted in grooves 86 in the side walls of the opening 11, said slides being bored to receive the trunnions 87, 87, of a lower section 88 having a transverse shaft bearing hollowed out at its top and having in the bottom a seat 89 for the end of the adjusting screw 13. (See Figs. 1 and 14.) Caps or upper sections 90 are bolted upon said lower sections 88 of the bearing boxes. Rotatably mounted in the said journal-boxes or bearings 12 is a main shaft 17, said shaft extending laterally across the main framework and having suitably mounted upon itself between the side plates 2, 2 a pulley 18 and a grinding wheel 19, said grinding wheel being preferably made with a concave peripheral grinding surface, substantially as illustrated. This grinding wheel is exposed at its upper edge by an aperture 20 in the table 7, and obviously by adjusting the screws 13 the grinding wheel can be made to project or extend upward through the said aperture 20, more or less.

Suitably secured upon the upper surface of the table 7 near its opposite ends are pedestals 21 and 22, provided with journal boxes or bearings 23 and 24, respectively, and rotatably mounted in said journal-boxes or bearings 23 and 24 is a shaft 25. This shaft is preferably parallel to the inclined table 7 or upper surface thereof, but with relation to a vertical plane extending centrally and longitudinally of the said table, the said shaft 25 is angularly arranged, so that it extends from near one side of the machine at one end of the table, to near the opposite side of the machine at the other end of the said table.

Suitably secured upon said angularly disposed shaft 25 is a pair of wire-rod feed rollers, wheels or disks, as 26 and 27, the disk, wheel or roller 26 being located above said grinding wheel 19 and in a plane approximately at right angles to the plane of the grinding-wheel, so as to extend at its periphery transversely of the peripheral grinding face of the grinding wheel 19, substantially in the manner shown in the several figures of the drawings.

Upon its upper end portion, preferably outside the pedestal 22, the said shaft 25 is provided with a worm-wheel 28, which is in mesh with a worm 29 of a shaft or spindle 30. The shaft or spindle 30 is rotatably mounted in suitably constructed bearing-portions 32 of a bracket 91 having arms 31 which are secured to and extend rearwardly from a rod or shaft 33 which is oscillatorily mounted in the bearing-portions 35 of lugs or bearing members 34 which extend from the end of the table 7. The said shaft or spindle 30, and the rod or shaft 33 are adapted to be held in their operative positions, with the worm 29 in engagement or mesh with the worm-wheel 28, by means of a crank-arm 36 which is secured at its upper end-portion to the said rod or shaft 33. The said crank-arm 36 extends in a downward direction, and pivotally connected with the lower end of said crank-arm 36 is a link 37, in the form of a long rod which extends forwardly beneath the table 7. The forward and opposite end-portion of this long rod or link 37 is pivotally connected as at 38, with one arm of a bell crank lever 92 which is fulcrumed as at 93 in a bracket 94 upon the bottom of the table 7. A post 42 rests upon the other arm of said bell-crank lever and projects through an opening 43 in the table 7 above the upper surface of the said table.

Figure 9:
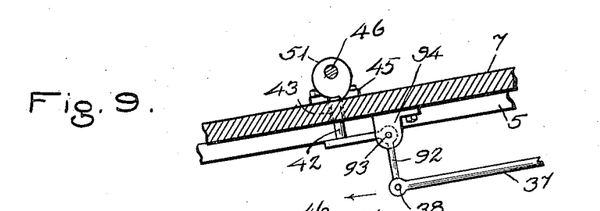

Suitably secured upon the upper face of the table 7 are a pair of bearings 45, in which is rotatably mounted a rod or spindle 46, said rod or spindle having its one end-portion extending beyond the side of the framework of the machine, and having secured thereto a lever or arm 47 provided with a handle-member 48. The said rod or spindle 46 has suitably secured thereon a series of cam-shaped elements 49, 50 and 51, the cam-surfaces of the said cams 49 and 50, by the manipulation of handle 48 and arm 47 in the direction of the arrow shown in Fig. 1 of the drawings, being adapted to be brought, respectively, into engagement with the upper ends of a pair of posts, as 52 and 53, said posts extending upwardly from the supporting flanges 5 of the frame 2, and through suitably formed openings 54 and 55 in the said table 7. It will be evident that this movement of the said cams 49 and 50, when the arm 47 and its handle are pulled in a forward direction, will cause the table 7 to be slightly raised at its lower end so as to be angularly disposed above the supporting flanges 5 of the framework of the machine from the position indicated in Fig. 9 of the drawings to that represented in Fig. 10. This lifts the work away from the grinding wheel and thus stops the grinding. At the same time, the cam 51 has turned so as to allow the post 42 which extends upwardly from the bell-crank 92, above described, to rise through the table, with the result that the various parts shown in said Fig. 9 of the drawings will be moved into their actuated positions represented in Fig.

Figures 10, 11, 12, 13, 14:
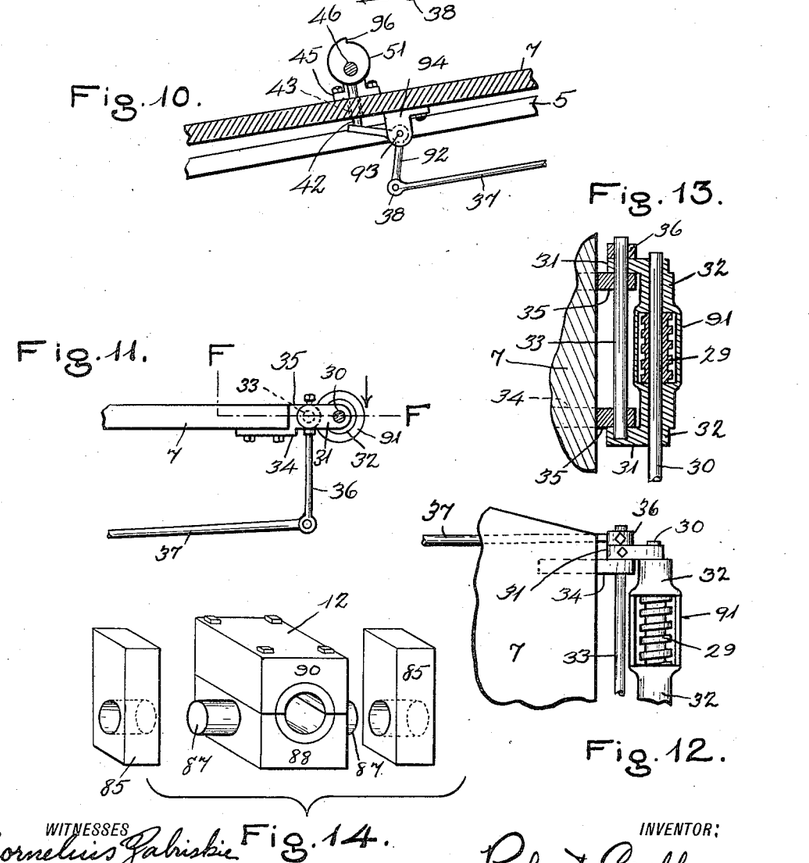

10 of the drawings. This movement is effected by gravitation of the worm 29 and connected parts mounted in the bracket 91 at the rear end of the machine, and which worm and other parts swing said bracket downward by their own weight as soon as the table is lifted or raised, thus disengaging the worm from the worm wheel 28. The lifting of the work away from the grinding wheel by raising the table 7 thus simultaneously disengages the worm and worm-wheel and stops the feeding of the work or pieces of wire across the grinding wheel. The rod 37 connecting the crank arm 36 of the pivotal rod or shaft of the said bracket with the said downwardly extending arm of the bell-crank 92 transmits motion of one of said arms to the other, and thus when the lever 47 is again thrown back into position to let the table 7 drop onto the flanges 5, 5 of the frame, the downward movement of the post 42 through the table is transmitted to swing the bracket 31 upward and hold the worm 29 in mesh with the worm-wheel 28 for causing the rotation of the shaft 25 again.

The cams 49 and 50 have peripheral stops 95 which limit their rotation to raise the table, by engaging the posts 52, 53 laterally, and similarly the cam 51 has a stop 96 to limit its rotation to depress the post 42 and swing the bell-crank to raise the worm 29 into mesh with the worm wheel 28. The lever 47 thus swings between fixed limits.

Rotary motion of the shaft or spindle 30 and of the shaft 17 upon which the grinding-wheel 19 is mounted, is produced by means of a belt 56, said belt extending from a suitable source of power (not shown) over a pulley 57 which is mounted upon the shaft 30, and then downwardly beneath an idler 58 which is mounted between the sides 2 of the framework of the machine, and over the pulley-wheel 18 of the main shaft 17, all of which is clearly indicated in Fig. 1 of the drawings. It will thus be seen that the same belt 56 drives both the grinding wheel and the feeding shaft 25, which conduces to great simplicity and compactness of the machine or apparatus. The idler 58 not only changes the direction of the belt 56, but also causes it to wrap about a quarter turn around the pulley 57, so as to secure good frictional contact therewith. It will be understood that the grinding-wheel makes about fifteen hundred revolutions a minute, while the main shaft 25 makes only two or three, and that these different speeds are obtained by means of the worm and worm-wheel 29, 28, and relative sizes of the different pulleys.

Figure 5:
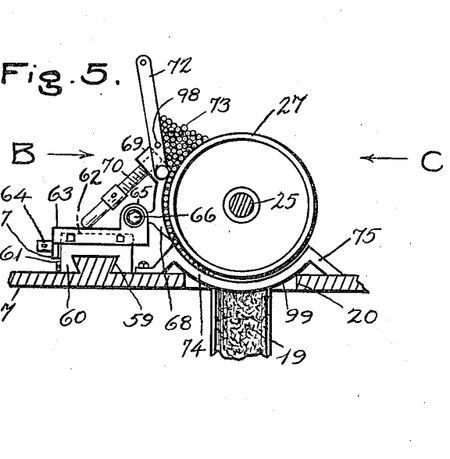
Fig. 5 is a detail transverse section at line A, Fig. 1, of a portion of the table of the machine, showing in elevation the means for holding and feeding the wire rods or pieces to the grinding wheel, a part of said grinding wheel being also represented.
Figure 6:
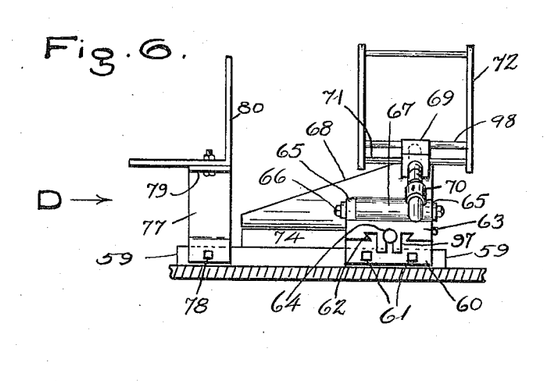
Fig. 6 is a front view of the said holding and feeding means, looking in the direction of the arrow B in Fig. 5.
Figure 7:
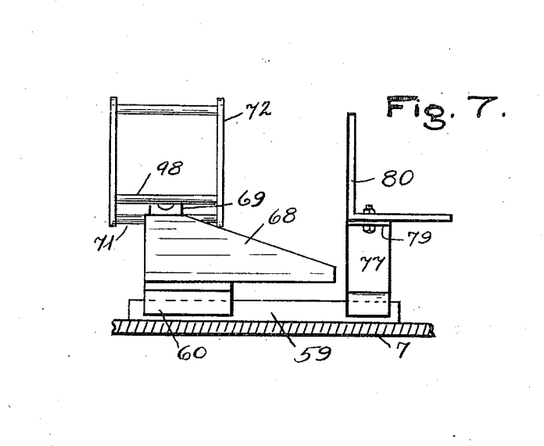
Fig. 7 is a rear view of said holding and feeding means, looking in the direction of the arrow C in said Fig. 5, the feeding wheel or disk and the grinding wheel being omitted from both Figs. 6 and 7, and the table of the machine being represented in section.
Figure 8:
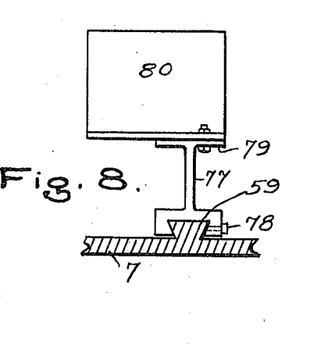
Fig. 8 is an end view of a portion of the said holding and feeding means, looking in the direction of the arrow D in Fig. 6.

Referring now more particularly to Figs. 1, 2, 5, 6, 7 and 8 of the drawings, it will be seen that the table 7 of the machine is made with a suitably formed longitudinal guide 59, upon which is slidably and adjustably arranged a carrier 60, said carrier being secured in its adjusted position upon the said guide 59 by means of suitable set screws 61 or other fastening means. The said carrier 60 is also provided with suitably formed transverse guides 62 for the slidably adjustable arrangement of a second carrier 63 upon said carrier 60. This carrier 63 can be moved closer to or farther away from the feed-wheel or disk 26 by means of an adjusting screw 64, threaded into the end of the guide 62 and having next its head a neck fitting in the slot of a depending tail-piece 97 on the carrier, as will be clearly evident. The carrier 63 is also provided with upwardly extending and perforated ears or lugs 65 in which is mounted a suitable hinge pin 66. This pin 66 carries a sleeve-like member 67, arranged upon said pin 66 between the ears or lugs 65, and suitably connected with the said sleeve-like member 67 is a guide-plate or element as 68 which extends past both feeding disks 26, 27 and is concaved adjacent thereto or arc-shaped in vertical cross-section in conformity thereto, so as to form a feed passage therewith through which a single layer of wires can roll or pass, as will be clearly evident more particularly from an inspection of Fig. 5 of the drawings. The said guide-plate or element 68 is also provided, preferably at its highest point or upper edge, with an internally screw-threaded portion or projection 69 in which is arranged the screw-threaded end portion of an adjusting screw 70 which extends outward and downward to engage at its lower rounded end the top of the carrier 63. Obviously this screw 70 serves as a brace to hold the upper edge of the guide-plate or element 68 toward the feeding disks, and said guide-plate or element can be adjusted by turning the said screw 70 so as to swing the guide-plate or element 68 on the pin 66. Extending through the said screw-threaded portion 69 or upper portion of the guide-plate or element 68, and substantially parallel to the feeding shaft 25, is a rod 71, said rod having mounted upon itself a suitably formed holding or supporting frame 72 between which and the upper part of the feeding disks 26, 27, the pieces of wire to be pointed may lie, as shown in Fig. 5, more especially. This frame 72 is pivoted by means of the said rod 71, and held against swinging outward too far by means of a second rod 98, a little above said pivotal rod 71 engaging the screw-threaded portion 69, as will be clearly evident from an inspection of Figs. 5 and 6 of the drawings.

The wire rods or pieces, indicated by the reference numeral 73 in Fig. 5 of the drawings, are laid between the peripheral surfaces of the feed-wheels or disks 26 and 27, and the said frame 72, so that the rotary movement of the said disks will cause a series of single rods or pieces to be fed downwardly between the disks and the concave surface portion of the guide-plate or element 68, as clearly represented in said Fig. 5 of the drawings. The table 7 has also secured thereon beneath the feeding disks 26 and 27 a trough-like guide member or element 99 whose inner surface is substantially concentric with the peripheral surface of the feeding disks and at substantially the same distance therefrom as the guide-plate or element 68. This guide-member or element 99 extends from said guide-plate or element 68, as at 74, under the feeding disks and far enough to the opposite sides of the same, as at 75, to discharge the pointed pieces of wire into a suitable receptacle. This guide member or element 99 and the feeding disks 26, 27 are preferably covered with rubber at their coöperating surfaces, as is common in the art and therefore not shown in the drawings, and said guiding member or element 99 extends at the middle portion of its forward end closely adjacent to the surface of the grinding wheel 19, which is exposed at its upper peripheral portion sufficiently, however, to grind or sharpen the ends of the pieces of wire. The angular relation of the feeding shaft 25 to the table 7 is such as to properly point or taper the ends of the pieces of wire, as will be understood. A pan or receptacle of any suitable kind may be placed upon the table 7 in the support 100 to receive the pointed wires or rods from the delivery portion 75 of the guide-member or element 99 beneath the receiving disks.

To hold the ends of all the pieces of wire or rods which are to be sharpened in alinement or even with one another, so that they will be properly fed to the grinding wheel 19, I have adjustably mounted upon the previously mentioned guide 59 a supporting member 77, said member being adapted to be secured in adjusted position upon the guide 59 by means of a set-screw 78 or equivalent fastening means. Said supporting member 77 is provided upon its upper edge with a lateral flange or projection 79 upon which is suitably mounted and held in place an L-shaped guide-plate 80 against which the ends of the pieces of wire or rods abut so as to keep them all even. This stop-plate 80 can thus be adjusted to any desired position, as for different lengths of wire or the like, and its broad foot affords opportunity for the operator to strike the ends of a handful of wires or rods, held vertical, so as to get them even.

Figure 3:
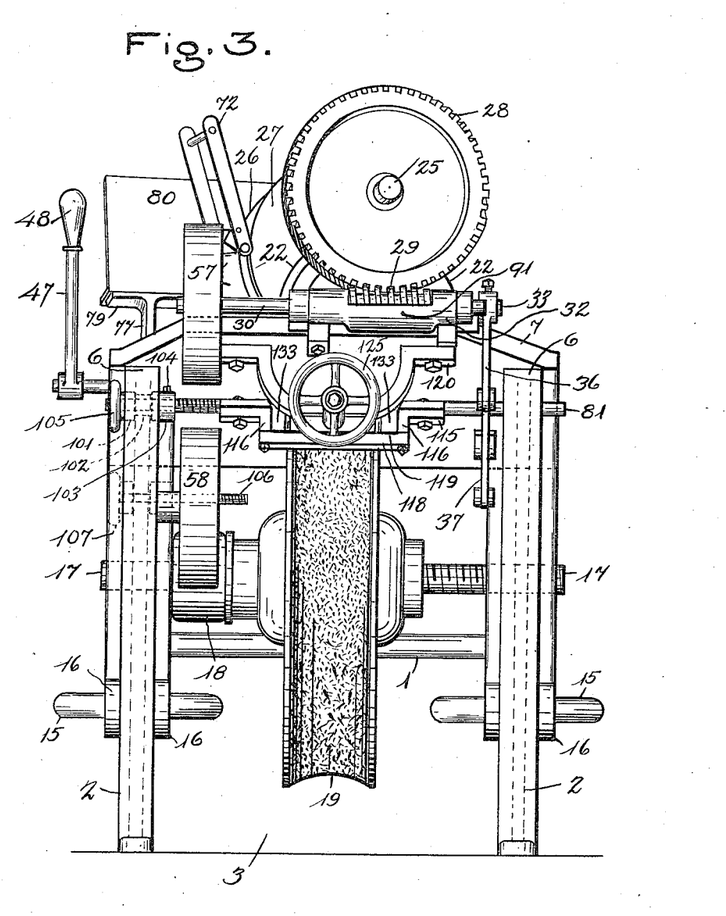
Figs. 3 and 4 are the two end elevations of the machine or apparatus.
Figure 4:
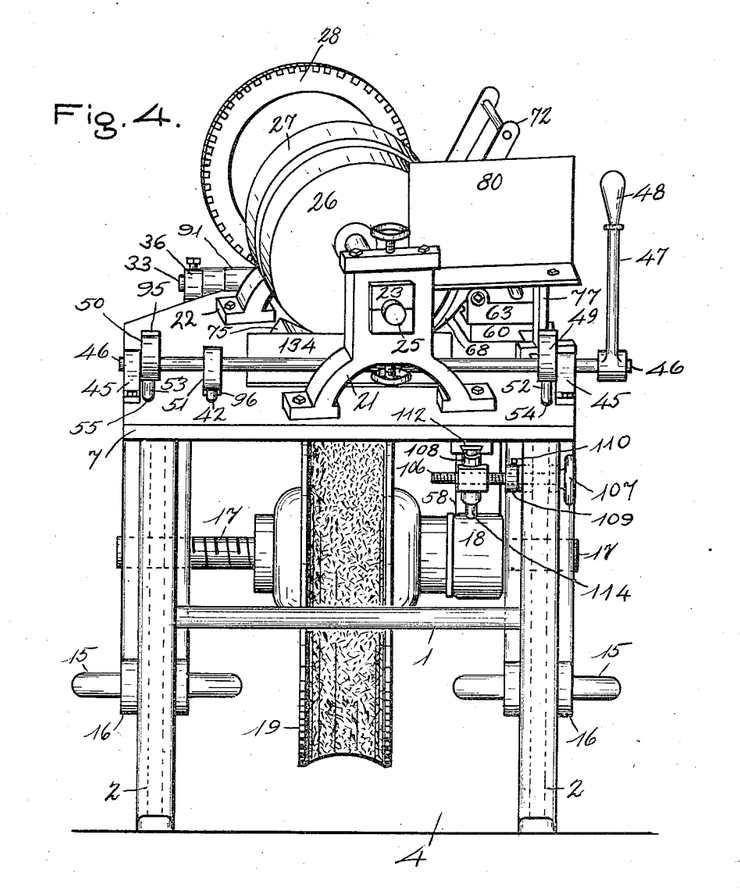

As before stated, the table 7 is hinged upon a rod 81 which extends transversely of the frame and through the opposite sides 2, 2 thereof, as shown in Fig. 3. This rod 81 is at its end away from the operator free to slide in the frame, and at its end next the operator is threaded and screwed into a correspondingly threaded sleeve or nut 101 which is mounted in the side of the frame so as to rotate without longitudinal movement. I have shown this nut having a reduced portion 102 extending through the side 2 and having a collar 103 made fast upon its end inside the side 2 by a set screw 104, but any other construction answering the same purpose may be used, if desired. A hand-wheel 105 upon the outer end of said sleeve or nut 101 enables the same to be turned, and thus the rod 81 can be slid longitudinally. This sliding shifts the rear end of the table laterally, in either direction, to adjust its position. The forward end of the table 7 is adjusted laterally by means of a screw shaft 106 mounted to rotate in the side 2 next the operator without longitudinal movement and having at its outer end a hand-wheel 107 for turning. The inner threaded end of this screw 106 works in a correspondingly-threaded horizontal socket of a carrier 108 which at its upper end is connected to the table 7 so that as the carrier is shifted the table shifts with it laterally. Either end of the table can thus be shifted laterally independent of the other, or both can be shifted at the same time. The screw shaft 106 is shown unthreaded next its hand-wheel 107, where it extends through the side 2, and having a collar 109 made fast on itself just inside said side 2 by means of a set screw 110.

Means are provided at the rear or upper end of the table 7 for shifting it longitudinally, and in order to enable such longitudinal adjustment independent of the transverse adjustment, the carrier 108 at the lower end of the table above-mentioned has at its top a foot 111 working in an undercut slideway 112 arranged longitudinally on the lower side of the table 7, see Figs. 1 and 16. Furthermore, to allow such raising and lowering of the lower end of the table 7 as has been described, the said carrier provides a vertical slideway 113 to receive a plunger or post 114 depending from the said sliding foot 111. Obviously, this plunger or post 114 can twist in its socket when the high end of the table 7 is moved laterally independent of the lower end, as well as slide therein when the table is raised or lowered, and of course the whole carrier can rock on the screw shaft 106 when necessary. Perfect freedom of movement is thus secured for every other adjustment of the table, by the carrier 108, and yet said carrier holds the front end of the table as to lateral movement.

In order to adjustably support the upper end of the table 7 upon the pivotal rod 81, said rod has at its under side a yoke 115 bolted to said rod 81 with depending blocks 116, 116 on opposite sides of a central threaded socket-piece 117 depending from the rear edge of the yoke. A plate 118 bolted on the lower ends of said blocks 116, 116, provides a closed slideway 119 between itself and the yoke, which will be hereinafter referred to. To the rear of rod 81 a hanger 120 is bolted to the under side of the table 7 transversely of the same and depending from it, and from said hanger or horizontal flange 133 thereof arms 121, 121 extend forward substantially parallel to the table through the slideway 119, of the yoke 115, said arms being connected forward of the said yoke by a crosspiece 122. A screw shaft 123 extends loosely through the said horizontal flange 133 of the hanger 120, and at its forward end has a bearing in the said crosspiece 122, being threaded intermediate of said hanger and crosspiece to work in the socket piece 117 of the yoke 115 before described. A collar 124 fixed upon said screw shaft forward of the hanger 120 prevents longitudinal movement of the screw shaft, and thus upon turning said screw shaft by means of a hand-wheel 125 upon its rearwardly projecting end, the table will be slid longitudinally forward or rearward as desired.

In order to allow the front end of the table to be adjusted laterally independent of the rear end, the bolts through the ends of the yoke 115 into the rod or bar 81 work in curved transverse slots 126 in said yoke. The middle bolt, at 127, provides a center for such swinging of the yoke when the front end of the table is adjusted laterally independent of the rear end.

Figure 17:
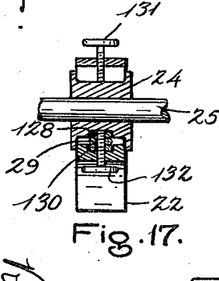
Fig. 17 is a detail section, taken vertically and longitudinally of the feeding disk shaft, through the bearing therefor at the rear or higher end of the machine.

It will be noted that the journal boxes or bearings 23 and 24 in the pedestals 21 and 22 are adapted to be raised and lowered, if necessary, so as to adjust said shaft with reference to the table 7, as is old and well-known in the art. Furthermore, the bearing box 24 at the higher or rear end of the machine is socketed at its bottom, as at 128 in Fig. 17, to receive a coiled spring 129 between itself and the bottom of the slideway 130 for said box 24. This spring 129 is stiff enough to raise the bearing box and shaft therein at the high end of the machine, when the upper screw 131 is slackened, so that it is not necessary to work the lower screw 132 or use a crow-bar to raise the shaft. It is often necessary to so raise the shaft because of pieces of wire getting crossed in feeding, in order to remove them, and by my construction such raising is done quickly and automatically.

The post 42 projecting through the table 7 is preferably loose or separate with respect to the bell-crank lever 92 which operates the link 37 and power disconnecting means at the rear end of the machine, and likewise the posts 52, 53 are separate at their lower ends from the frame flanges 5, the openings through the table 7 for all said posts being of such size as to provide guiding slideways for said posts.

A hood 134 is located at the front end of the opening 20 in the table to receive the sparks and dust from the grinding-wheel.

Having thus described the invention what I claim is:

1. In a needle or pin-point grinding machine, the combination with a frame-work, said frame-work being higher at one end than at its other end, a table mounted upon said frame-work, said table being formed with an opening, a grinding wheel rotatably mounted in said frame-work, said grinding wheel having its upper peripheral portion extending through the opening in said table so as to project above the same, pedestals mounted upon said table, a journal box connected with each pedestal, a shaft rotatably mounted in said journal-boxes, said pedestals and shaft being angularly disposed with relation to the central longitudinal plane of the machine, wire-rod feeding disks upon said shaft, means upon said table for holding and feeding the wire-rods successively across the grinding surface of the grinding wheel, and mechanism upon the said table for angularly raising or tilting the table and simultaneously arresting the rotary movements of the said shaft upon which said feeding disks are mounted.

2. In a needle or pin-point grinding machine, the combination with a frame-work, said frame-work being higher at one end than at its other end, a table mounted upon said frame-work, said table being formed with an opening, a grinding-wheel rotatably mounted in said frame-work, said grinding wheel having its upper peripheral portion extending through the opening in said table so as to project above the same, pedestals mounted upon said table, a journal box connected with each pedestal, a shaft rotatably mounted in said journal-boxes, said pedestals and shaft being angularly disposed with relation to the central longitudinal plane of the machine, wire-rod feeding disks upon said shaft, means upon said table for holding and feeding the wire-rods successively across the grinding surface of the grinding-wheel, means also upon said table for receiving the pointed wire-rods from the grinding-wheel and feeding them into a receptacle, and mechanism upon the said table for angularly raising or tilting the table and simultaneously arresting the rotary movements of the said shaft upon which said feeding disks are mounted.

3. In a needle or pin-point grinding machine, the combination with a framework, said framework being higher at one end than at its other end, a table mounted upon said frame-work, said table being formed with an opening, a grinding wheel rotatably mounted in said frame-work, said grinding wheel having its upper peripheral portion extending through the opening in said table so as to project above the same, pedestals mounted upon said table, a journal box connected with each pedestal, a shaft rotatably mounted in said journal-boxes, said pedestals and shaft being angularly disposed with relation to the central longitudinal plane of the machine, wire-rod feeding disks upon said shaft, a guide upon said table, said guide extending in a longitudinal direction, a carrier slidably arranged upon said guide, a second carrier slidably arranged upon said first-mentioned carrier and being adjustable with relation to said feeding disks, a guide-plate pivotally connected with said second-mentioned carrier, and a supporting frame adjustably connected with said pivotal guide-plate, all arranged so as to hold and feed the wire rods successively across the grinding surface of the grinding-wheel, and mechanism upon the said table for angularly raising or tilting the table and simultaneously arresting the rotary movements of the said shaft upon which said feeding disks are mounted.

4. In a needle or pin-point grinding machine, the combination with a frame-work, said frame-work being higher at one end than at its other end, a table mounted upon said frame-work, said table being formed with an opening, a grinding-wheel rotatably mounted in said frame-work, said grinding wheel having its upper peripheral portion extending through the opening in said table so as to project above the same, pedestals mounted upon said table, a journal-box connected with each pedestal, a shaft rotatably mounted in said journal-boxes, said pedestals and shaft being angularly disposed with relation to the central longitudinal plane of the machine, wire-rod feeding disks upon said shaft, a guide upon said table, said guide extending in a longitudinal direction, a carrier slidably arranged upon said guide, a second carrier slidably arranged upon said first-mentioned carrier, and being adjustable with relation to said feeding disks, a guide-plate pivotally connected with said second-mentioned carrier, a supporting frame adjustably connected with said pivoted guide plate, all arranged so as to hold and feed the wire rods successively across the grinding surface of the grinding wheel, means also upon said table for receiving the pointed wire-rods from the grinding wheel and feeding them into a receptacle, and mechanism upon the said table for angularly raising or tilting the table and simultaneously arresting the rotary movements of the said shaft upon which said feeding disks are mounted.

5. A needle or pin-point grinding machine, comprising a framework, said frame-work being higher at one end than at the other end, a table mounted upon said frame-work, said table being formed with an opening, a main shaft extending laterally across said framework, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank-arms secured to and extending from said rod, said crank-arms being formed with bearing portions, a worm-shaft mounted in the bearing-portions of said crank-arms, a worm upon said shaft adapted to mesh with said worm-wheel, means connected with said crank-arm carrying rod for throwing said worm into and out of mesh with said worm-wheel, and means upon said table for holding and feeding the wire-rods successively across the grinding surface of the grinding wheel.

6. A needle or pin-point grinding machine, comprising a framework, said frame-work being higher at one end than at the other end, a table mounted upon said frame-work, said table being formed with an opening, a main shaft extending laterally across said framework, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank-arms secured to and extending from said rod, said crank-arms being formed with bearing-portions, a worm-shaft mounted in the bearing-portions of said crank-arms, a worm upon said shaft adapted to mesh with said worm-wheel, means connected with said crank-arm carrying rod for throwing said worm into and out of mesh with said worm-wheel, means upon said table for holding and feeding the wire rods successively across the grinding surface of the grinding wheel, and means also upon said table for receiving the pointed wire-rods from the grinding wheel and feeding them into a receptacle.

7. A needle or pin-point grinding machine, comprising a framework, said frame-work being higher at one end than at the other end, a table mounted upon said frame-work, said table being formed with an opening, a main shaft extending laterally across said framework, a driving pulley upon said shaft, a grinding-wheel upon said shaft, said grinding-wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank-arms secured to and extending from said rod, said crank-arms being formed with bearing portions, a worm-shaft mounted in the bearing-portions of said crank-arms, a worm upon said shaft adapted to mesh with said worm-wheel, means connected with said crank-arm carrying rod for throwing said worm into and out of mesh with said worm-wheel, a guide upon said table, said guide extending in a longitudinal direction, a carrier slidably arranged upon said guide, a second carrier slidably arranged upon said first-mentioned carrier, and being adjustable with relation to said feeding disks, a guide-plate pivotally connected with said second-mentioned carrier, and a supporting frame adjustably connected with said pivoted guide-plate, all arranged so as to hold and feed the wire rods successively across the grinding surface of the grinding wheel.

8. A needle or pin-point grinding machine, comprising a framework, said framework being higher at one end than at the other end, a table mounted upon said framework, said table being formed with an opening, a main shaft extending laterally across said framework, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank-arms secured to and extending from said rod, said crank-arms being formed with bearing-portions, a worm-shaft mounted in the bearing-portions of said crank-arms, a worm upon said shaft adapted to mesh with said worm-wheel, means connected with said crank-arm carrying rod for throwing said worm into and out of mesh with said worm-wheel, a guide upon said table, said guide extending in a longitudinal direction, a carrier slidably arranged upon said guide, a second carrier slidably arranged upon said first-mentioned carrier, and being adjustable with relation to said feeding disks, a guide-plate pivotally connected with said second-mentioned carrier, a supporting frame adjustably connected with said pivoted guide-plate, all arranged so as to hold and feed the wire rods successively across the grinding surface of the grinding-wheel, and means also upon said table for receiving the pointed wire-rods from the grinding wheel and feeding them into a receptacle.

9. A needle or pin-point grinding machine, comprising a framework, said framework being higher at one end than at the other end, a table mounted upon said framework, said table being formed with an opening, a main shaft extending laterally across said framework, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank-arms secured to and extending from said rod, said crank-arms being formed with bearing-portions, a worm-shaft mounted in the bearing-portions of said crank-arms, a worm upon said shaft adapted to mesh with said worm-wheel, another crank-arm secured to and extending in a downward direction from said crank-arm carrying rod, a link connected with said last-mentioned crank-arm, mechanism connected with said framework and the table for angularly raising or tilting the table and simultaneously actuating said link for throwing said worm into and out of mesh with said worm-wheel, and means upon said table for holding and feeding the wire rods successively across the grinding surface of the grinding-wheel.

10. A needle or pin-point grinding machine, comprising a framework, said framework being higher at one end than at the other end, a table mounted upon said framework, said table being formed with an opening, a main shaft extending laterally across said framework, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing lugs, crank-arms secured to and extending from said rod, said crank-arms being formed with bearing-portions, a worm-shaft mounted in the bearing portions of said crank-arms, a worm upon said shaft and adapted to mesh with said worm-wheel, another crank-arm secured to and extending in a downward direction from said crank-arm carrying rod, a link connected with said last-mentioned crank-arm, mechanism connected with said framework and the table for angularly raising or tilting the table and simultaneously actuating said link for throwing said worm into and out of mesh with said worm-wheel, means upon said table for holding and feeding the wire-rods successively across the grinding surface of the grinding-wheel, and means also upon said table for receiving the pointed wire rods from the grinding-wheel and feeding them into a receptacle.

11. A needle or pin-point grinding machine, comprising a framework, said framework being higher at one end than at the other end, a table mounted upon said framework, said table being formed with an opening, a main shaft extending laterally across said framework, a driving pulley upon said shaft, a grinding-wheel upon said shaft, said grinding wheel having its upper peripheral portion extending through the opening in said table so as to project above the same, pedestals mounted upon said table, a journal-box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank arms secured to and extending from said rod, said crank-arms being formed with bearing-portions, a worm-shaft mounted in the bearing-portions of said crank-arms, a worm upon said shaft adapted to mesh with said worm-wheel, another crank-arm secured to and extending in a downward direction from said crank-arm carrying rod, a link connected with said last-mentioned crank-arm, mechanism connected with said framework and the table for angularly raising or tilting the table and simultaneously actuating said link for throwing said worm into and out of mesh with said worm-wheel, a guide upon said table, said guide extending in a longitudinal direction, a carrier slidably arranged upon said guide, a second carrier slidably arranged upon said first-mentioned carrier and being adjustable with relation to said feeding disks, a guide-plate pivotally connected with said second-mentioned carrier, and a supporting frame adjustably connected with said pivoted guide-plate, all arranged so as to hold and feed the wire rods successively across the grinding surface of the grinding-wheel.

12. A needle or pin-point grinding machine, comprising a framework, said framework being higher at one end than at the other end, a table mounted upon said framework, said table being formed with an opening, a main shaft extending laterally across said framework, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank-arms secured to and extending from said rod, said crank-arms being formed with bearing-portions, a worm-shaft mounted in the bearing-portions of said crank-arms, a worm upon said shaft adapted to mesh with said worm-wheel, another crank-arm secured to and extending in a downward direction from said crank-arm carrying rod, a link connected with said last-mentioned crank-arm, mechanism connected with said framework, and the table for angularly raising or tilting the table and simultaneously actuating said link for throwing said worm into and out of mesh with said worm-wheel, a guide upon said table, said guide extending in a longitudinal direction, a carrier slidably arranged upon said guide, a second carrier slidably arranged upon said first-mentioned carrier, and being adjustable with relation to said feeding disks, a guide-plate pivotally connected with said second-mentioned carrier, a supporting frame adjustably connected with said pivoted guide-plate, all arranged so as to hold and feed the wire rods successively across the grinding surface of the grinding wheel, and means also upon said table for receiving the pointed wire-rods from the grinding wheel and feeding them into a receptacle.

13. A needle or pin-point grinding machine, comprising a framework, said framework being higher at one end than at the other end, a table mounted upon said framework, said table being formed with an opening, a main shaft extending laterally across said frame-work, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks, and a worm-wheel upon said shaft, bearing lugs extending from said table, a rod or shaft oscillatorily mounted in said bearing-lugs, crank-arms secured to and extending from said rod, said crank-arms being formed with bearing-portions, a worm-shaft mounted in the bearing-portions of said crank-arms, a worm upon said shaft adapted to mesh with said worm-wheel, another crank-arm secured to and extending in a downward direction from said crank-arm carrying rod, a link connected with said last-mentioned crank-arm, mechanism connected with said frame-work and the table for angularly raising or tilting the table and simultaneously actuating said link for throwing said worm into and out of mesh with said worm-wheel, consisting of a series of pins or posts extending upwardly from the frame-work through said table, a bell-crank pivoted on said table with one arm extending downwardly therefrom and pivotally connected with said previously mentioned link, a pin or post extending upwardly from the other arm of said bell-crank through said table, a cam-shaft located upon said table, and a series of cams upon said shaft adapted to be brought into operative engagement with all said pins or posts, and means upon said table for holding and feeding the wire-rods successively across the grinding surface of the grinding wheel.

14. A needle or pin-point grinding machine, comprising a frame-work, said frame-work being higher at one end than at the other end, a table mounted upon said frame-work, said table being formed with an opening, a main shaft extending laterally across said frame-work, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal-boxes, wire-feeding disks and a worm-wheel upon said shaft, bearing lugs extending from said table, a rod or shaft oscillatorily mounted in said bearing-lugs, crank-arms secured to and extending from said rod, said crank-arms being formed with bearing-portions, a worm-shaft mounted in the bearing-portions of said crank-arms, a worm upon said shaft adapted to mesh with said worm-wheel, another crank-arm secured to and extending in a downward direction from said crank-arm carrying rod, a link connected with said last-mentioned crank-arm, mechanism connected with said frame-work and the table for angularly raising or tilting the table and simultaneously actuating said link for throwing said worm into and out of mesh with said worm-wheel, consisting of a series of pins or posts extending upwardly from the frame-work through said table, a bell-crank pivoted on said table with one arm extending downwardly therefrom and pivotally connected with said previously mentioned link, a pin or post extending upwardly from the other arm of said bell-crank through said table, a cam-shaft located upon said table, and a series of cams upon said shaft adapted to be brought into operative engagement with all said pins or posts, means upon said table for holding and feeding the wire-rods successively across the grinding surface of the grinding-wheel, and means also upon said table for receiving the pointed wire-rods from the grinding wheel and feeding them into a receptacle.

15. A needle or pin-point grinding machine, comprising a frame-work, said frame-work being higher at one end than at the other end, a table mounted upon said frame-work, said table being formed with an opening, a main shaft extending laterally across said frame-work, a driving-pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank-arms secured to and extending from said rod, said crank arms being formed with bearing-portions, a worm-shaft mounted in the bearing-portions of said crank-arms, a worm upon said shaft adapted to mesh with said worm-wheel, another crank-arm secured to and extending in a downward direction from said crank-arm carrying rod, a link connected with said last-mentioned crank-arm, mechanism connected with said frame-work and the table for angularly raising or tilting the table and simultaneously actuating said link for throwing said worm into and out of mesh with said worm-wheel, consisting of a series of pins or posts extending upwardly from the frame-work through said table, a bell-crank pivoted on said table with one arm extending downwardly therefrom and pivotally connected with said previously mentioned link, a pin or post extending upwardly from the other arm of said bell-crank through said table, a cam-shaft located upon said table, and a series of cams upon said shaft adapted to be brought into operative engagement with all said pins or posts, a guide upon said table, said guide extending in a longitudinal direction, a carrier slidably arranged upon said guide, a second carrier slidably arranged upon said first-mentioned carrier, and being adjustable with relation to said feeding disks, a guide-plate pivotally connected with said second-mentioned carrier, a supporting frame adjustably connected with said pivoted guide-plate, all arranged so as to hold and feed the wire rods successively across the grinding surface of the grinding wheel.

16. A needle or pin-point grinding machine, comprising frame-work, said framework being higher at one end than at the other end, a table mounted upon said framework, said table being formed with an opening, a main shaft extending laterally across said frame-work, a driving pulley upon said shaft, a grinding-wheel upon said shaft, said grinding wheel having its upper peripheral portion extending through the opening in said table so as to project above the same, pedestals mounted upon said table, a journal box connected with each pedestal, a shaft rotatably mounted in said journal boxes, wire-feeding disks and a worm-wheel upon said shaft, bearing lugs extending from said table, a rod or shaft oscillatorily mounted in said bearing-lugs, crank-arms secured to and extending from said rod, said crank-arms being formed with bearing-portions, a worm-shaft mounted in the bearing-portions of said crank-arms, a worm upon said shaft adapted to mesh with said worm-wheel, another crank-arm secured to and extending in a downward direction from said crank-arm carrying rod, a link connected with said last-mentioned crank-arm, mechanism connected with said frame-work, and the table for angularly raising or tilting the table and simultaneously actuating said link for throwing said worm into and out of mesh with said worm-wheel, consisting of a series of pins or posts extending upwardly from the frame-work through said table, a bell-crank pivoted on said table with one arm extending downwardly therefrom and pivotally connected with said previously mentioned link, a pin or post extending upwardly from the other arm of said bell-crank through said table, a cam shaft adapted to be brought into operative engagement with all said pins or posts, a guide upon said table, said guide extending in a longitudinal direction, a carrier slidably arranged upon said guide, a second carrier slidably arranged upon said first-mentioned carrier, and being adjustable with relation to said feeding disks, a guide-plate pivotally connected with said second-mentioned carrier, a supporting frame adjustably connected with said pivoted guide-plate all arranged so as to hold and feed the wire rods successively across the grinding surface of the grinding wheel, and means also upon said table for receiving the pointed wire rods from the grinding-wheel and feeding them into a receptacle.

17. In a needle or pin-grinding machine, the combination with a frame-work and a tilting table thereon, of a shaft provided with feeding disks, a driving means connected with said shaft, and mechanism in engagement with said tilting table for arresting the movement of said shaft driving means.

18. In a needle or pin-grinding machine, the combination with a frame-work and a tilting table thereon, of a shaft provided with feeding disks, a driving means connected with said shaft, and mechanism in engagement with said tilting table for arresting the movement of said shaft driving means, consisting of a lever pivotally connected with said table, a post extending from said lever and through said table, a cam-shaft above said table, and a cam upon said shaft adapted to be brought into engagement with said post.

19. In a needle or pin-grinding machine, the combination with a framework and a tilting table thereon, of a shaft provided with feeding disks, a worm-wheel upon said shaft, bearing-lugs extending from said table, a rod or shaft oscillatorily mounted in said bearing-lugs, crank-arms secured to and extending from said rod, said crank-arms being formed with bearing-portions, a worm-shaft mounted in the bearing-portions of said crank-arms, a worm upon said shaft adapted to mesh with said worm-wheel, another crank-arm secured to and extending in a downward direction from said crank-arm carrying rod, a link connected with said last-mentioned crank-arm, and mechanism in engagement with said tilting table for actuating said last-mentioned crank-arm to throw said worm into or out of mesh with said worm-wheel, consisting of a bell-crank pivoted on said table with one arm extending downwardly therefrom and pivotally connected with said previously mentioned link, a post extending upwardly from the other arm of said bell-crank through said tilting table, a cam-shaft above said table, and a cam upon said shaft adapted to be brought into engagement with said post, substantially as and for the purposes set forth.

20. In a needle or pin-grinding machine, the combination with a frame-work and a tilting table thereon, of means for tilting said table consisting of a post connected with and extending upwardly through said table, a cam-shaft above said table, and a cam upon said shaft adapted to be brought into engagement with said post.

21. In a machine for grinding points, the combination of a frame, a shaft arranged transversely of said frame, a grinding wheel on said shaft, a pulley for rotating said grinding wheel, a feed disk shaft arranged longitudinally of the frame, a feeding disk on said last-mentioned shaft adapted to coöperate with the grinding wheel, a pulley for rotating said feed disk arranged in alinement with the said grinding wheel pulley, and a driving belt extending from a source of power over both said pulleys.

22. In a machine for grinding points, the combination of a frame, a shaft arranged transversely of said frame, a grinding wheel on said shaft, a pulley for rotating said grinding wheel, a feed disk shaft arranged longitudinally of the frame, a feeding disk on said last-mentioned shaft adapted to coöperate with the grinding wheel, a pulley for rotating said feed disk arranged in alinement with the said grinding wheel pulley, a driving belt extending from a source of power over both said pulleys, and an idle pulley between said grinding wheel pulley and feed-disk pulley adapted to bend the belt against said pulleys.

23. In a machine for grinding points, the combination of a frame, a shaft arranged transversely of said frame, a grinding wheel on said shaft, a pulley for rotating said grinding wheel, a feed-disk shaft arranged longitudinally of the frame, a feeding disk on said last-mentioned shaft adapted to coöperate with the grinding wheel, a pulley for rotating said feed disk arranged in alinement with the said grinding wheel pulley, a driving belt extending from a source of power over both said pulleys, and means for adjusting one of said pulleys in their plane.

24. In a machine for grinding points, the combination of a frame having opposite sides with vertical openings therein and slots in the walls of said openings, sliding blocks in said slots having alined seats in themselves, a bearing box in each opening comprising upper and lower sections and having opposite trunnions on said lower section projecting into said seats of the sliding blocks, means for raising and lowering said boxes a shaft in said boxes, a grinding wheel on said shaft, and a table and feeding disks.

25. In a machine for grinding points, the combination of a frame, a grinding wheel mounted in said frame, a table hinged to said frame and adjustable in edgewise direction, a feeding disk shaft mounted on said table, a feeding disk on said shaft adapted to coöperate with said grinding wheel, a worm wheel on said shaft, a worm for said worm wheel, bearings for said worm, means carried by said table for simultaneously tilting the table and moving said bearings toward and away from the worm wheel to carry said worm into and out of mesh with said worm wheel, and means for driving said worm and said grinding wheel.

26. In a machine for grinding points, the combination of a frame, a grinding wheel mounted in said frame, a table hinged to said frame and adjustable in edgewise direction, a feeding disk shaft mounted on said table, a feeding disk on said shaft adapted to coöperate with said grinding wheel, a worm wheel on said shaft, a worm for said worm wheel, means carried by said table for simultaneously tilting the table and moving said worm into and out of mesh with the worm wheel while keeping its axial line always parallel to a given fixed line, and means for driving said worm and said grinding wheel.

27. In a machine for grinding points, the combination of a frame, a grinding wheel mounted in said frame, a table hinged to said frame and adjustable in edgewise direction, a feeding disk shaft mounted on said table, a feeding disk on said shaft adapted to coöperate with said grinding wheel, a worm wheel on said shaft, a worm for said worm wheel, a shaft for said worm, a bracket having bearings for said shaft and hinged to the table with the line of hinging parallel to the central axial line of said bearings, means carried by said table for simultaneously tilting the table and swinging said bracket, and means for driving said worm and said grinding wheel.

28. In a machine for grinding points, the combination of a frame, a grinding wheel mounted in said frame, a table hinged to said frame and adjustable in edgewise direction, a feeding disk mounted on said table and adapted to coöperate with said grinding wheel, driving and driven members movable into and out of engagement for turning said disk, bell-cranks mounted upon the table one adapted to move said driving and driven members into and out of engagement, a link connecting said bell cranks, and means for simultaneously tilting the table and actuating the other said bell crank.

29. In a machine for grinding points, the combination of a frame, a grinding wheel mounted in said frame, a table hinged to said frame and adjustable in edgewise direction, a feeding disk mounted on said table and adapted to coöperate with said grinding wheel, a worm wheel for driving said feeding disk, a worm for said worm wheel adapted to engage and disengage the same, bell cranks mounted upon the table one adapted to move said worm and worm wheel members into and out of engagement, a link connecting said bell-cranks, and means for simultaneously tilting the table and actuating the other said bell crank.

30. In a machine for grinding points, the combination of a frame, a grinding wheel mounted in said frame, a table hinged to said frame and adjustable in edgewise direction, a feeding disk mounted on said table and adapted to coöperate with said grinding wheel, driving and driven members movable into and out of engagement for turning said disk, bell-cranks mounted upon the table one adapted to move said driving and driven members into and out of engagement, a link connecting said bell cranks, a cam shaft extending transversely of the table, cams on said shaft adapted one to actuate the bell crank and others to tilt the table, and means for rocking said cam shaft.

31. In a machine for grinding points, the combination of a frame, a grinding wheel mounted in said frame, a table hinged to said frame and adjustable in edgewise direction, a feeding disk mounted on said table and adapted to coöperate with said grinding wheel, means for turning said disk, driving and driven members movable into and out of engagement to turn said disk, a bell crank connected to said driving and driven members to move them out of and into engagement, a pin working through the table to engage said bell crank, other pins working through the table to engage the frame, a cam shaft on the table, cams on said shaft having peripheral stops limiting their rotation by engagement with the sides of said pins, and means for rocking said cam shaft.

32. In a machine for grinding points, the combination of a frame, a grinding wheel mounted in said frame, a rod extending transversely of said frame and adapted to turn, means for shifting said rod longitudinally, a table hinged on said rod and adapted to lie upon the top of the frame, means for adjusting said table longitudinally of the machine independent of said rod, a feeding disk on said table adapted to coöperate with said grinding wheel, and means for starting and stopping said feeding disk and tilting the table.

33. In a machine for grinding points, the combination of a frame, a grinding wheel mounted in said frame, a rod extending transversely between opposite sides of said frame and being both slidable and rotatable in one of said sides, a nut upon said rod held rotatably against longitudinal movement in the other side, a table mounted on said rod to tilt and adjust transversely of the machine therewith, means for adjusting said table longitudinally of the machine independent of said rod, a feeding disk on said table adapted to coöperate with said grinding wheel, and means for starting and stopping said feeding disk and tilting the table.

34. In a machine for grinding points, the combination of a frame, a grinding wheel mounted in said frame, a table hinged upon said frame at one end thereof, means for adjusting said table edgewise both transversely and longitudinally at its said hinged end, means at the other end of the table for moving it laterally while permitting both longitudinal adjustment and pivotal movement of the table, a feeding disk on said table, adapted to coöperate with said grinding wheel, and means for starting and stopping said feeding disk and tilting the table.

35. In a machine for grinding points, the combination of a frame, a grinding wheel mounted in said frame, a table hinged upon said frame at one end thereof and having a longitudinal slideway at the other end, means for adjusting said table edgewise both transversely and longitudinally at its said hinged end, a carrier at the other end of the table, means on the frame for adjusting said carrier laterally of the frame, a plunger working vertically in said carrier and having a head engaging said slideway, a feeding disk on said table adapted to coöperate with said grinding wheel, and means for starting and stopping said feeding disk and tilting the table.

36. In a machine for grinding points, the combination of a frame, a grinding wheel mounted in said frame, a table hinged upon said frame at one end thereof and having a longitudinal slideway at its other end, means for adjusting said table edgewise both transversely and longitudinally at its said hinged end, a carrier at the other end of the table having an upwardly-extending socket and a transverse interiorly-threaded aperture, a transverse screw shaft on the frame working in said aperture of the carrier and held against longitudinal movement, a plunger in said socket of the carrier having a head fitting said slideway of the table, said slideway having undercut walls holding the said head, a feeding disk on said table adapted to coöperate with said grinding wheel, and means for starting and stopping said feeding disk and tilting the table.

37. In a machine for grinding points, the combination of a frame, a grinding wheel mounted in said frame, a table on said frame, a pedestal on said table providing a vertical slideway, a bearing box in said slideway, a spring beneath said bearing box, a screw for moving said bearing box against the said spring, a second bearing in alinement with said sliding box, a shaft in said bearings, a feeding disk on said shaft adapted to coöperate with the grinding wheel, means for driving said shaft, and means for simultaneously tilting the table and stopping or starting said shaft.

ROBERT CRABB.

Witnesses:
CORNELIUS ZABRISKIE,
FRANCES E. BLODGETT.

---

Copies of this patent may be obtained for five cents each, by addressing the "Commissioner of Patents, Washington, D. C."